United States Patent
Thekkath et al.

(10) Patent No.: US 7,159,101 B1
(45) Date of Patent: Jan. 2, 2007

(54) SYSTEM AND METHOD TO TRACE HIGH PERFORMANCE MULTI-ISSUE PROCESSORS

(75) Inventors: Radhika Thekkath, Palo Alto, CA (US); Franz Treue, Roskilde (DK); Søren Kragh, Valby (DK); Vidya Rajagopalan, San Carlos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 463 days.

(21) Appl. No.: 10/448,324

(22) Filed: May 28, 2003

(51) Int. Cl.
*G06F 9/38* (2006.01)
(52) U.S. Cl. ..................... 712/227; 712/218
(58) Field of Classification Search ............... 712/225, 712/227, 218; 717/128; 703/22, 28
See application file for complete search history.

(56) References Cited

U.S. PATENT DOCUMENTS

| | | | |
|---|---|---|---|
| 3,473,154 A | 10/1969 | Couleur et al. | |
| 3,585,599 A | 6/1971 | Hitt | |
| 3,681,534 A | 8/1972 | Burian et al. | |
| 3,702,989 A | 11/1972 | Provenzano, Jr. et al. | |
| 3,704,363 A | 11/1972 | Salmassy et al. | |
| 3,707,725 A | 12/1972 | Dellheim | |
| 3,771,131 A | 11/1973 | Ling | |
| 3,794,831 A | 2/1974 | Frankeny et al. | |
| 3,805,038 A | 4/1974 | Buedel et al. | |
| 3,906,454 A | 9/1975 | Martin | |
| 4,205,370 A | 5/1980 | Hirtle | |
| 4,293,925 A | 10/1981 | Hang et al. | |
| 4,423,508 A | 12/1983 | Shiozaki et al. | |
| 4,462,077 A | 7/1984 | York | |
| 4,503,495 A | 3/1985 | Boudreau | |
| 4,511,960 A | 4/1985 | Boudreau | |
| 4,539,682 A | 9/1985 | Herman et al. | |
| 4,553,223 A | 11/1985 | Bouhelier et al. | |
| 4,554,661 A | 11/1985 | Bannister | |
| 4,590,550 A | 5/1986 | Eilert et al. | |
| 4,742,466 A | 5/1988 | Ochiai et al. | |
| 4,783,762 A | 11/1988 | Inoue et al. | |
| 4,835,675 A | 5/1989 | Kawai | |
| 5,058,114 A | 10/1991 | Kuboki et al. | |
| 5,084,814 A | 1/1992 | Vaglica et al. | |
| 5,150,470 A | 9/1992 | Hicks et al. | |
| 5,274,811 A | 12/1993 | Borg et al. | |
| 5,289,587 A | 2/1994 | Razban | |
| 5,404,470 A | 4/1995 | Miyake | |
| 5,434,622 A | 7/1995 | Lim | |
| 5,471,594 A | 11/1995 | Stone | |
| 5,473,754 A | 12/1995 | Folwell et al. | |
| 5,491,793 A | 2/1996 | Somasundaram et al. | |
| 5,533,193 A | 7/1996 | Roscoe | |

(Continued)

FOREIGN PATENT DOCUMENTS

GB  2 329 048  10/1999

(Continued)

OTHER PUBLICATIONS

MIPS64 5Kc™ Processor Core Datasheet, Revision 1.7.4, pp. 1-40, Dec. 14, 1999.

(Continued)

*Primary Examiner*—Eric Coleman
(74) *Attorney, Agent, or Firm*—Cooley Godward Kronish LLP (57) ABSTRACT

A system and method for program counter and data tracing in a multi-issue processor is disclosed. Instructions are traced in program sequence order. In one embodiment instructions are traced in graduation order from a reorder buffer. The tracing mechanism of the present invention enables increased visibility into the hardware and software state of the processor core.

11 Claims, 10 Drawing Sheets

U.S. PATENT DOCUMENTS

| | | | |
|---|---|---|---|
| 5,581,691 A | 12/1996 | Hsu et al. | |
| 5,598,421 A | 1/1997 | Tran et al. | |
| 5,604,878 A * | 2/1997 | Colwell et al. | 712/217 |
| 5,621,886 A | 4/1997 | Alpert et al. | |
| 5,625,785 A | 4/1997 | Miura et al. | |
| 5,642,478 A | 6/1997 | Chen et al. | |
| 5,642,479 A | 6/1997 | Flynn | |
| 5,689,636 A | 11/1997 | Kleber et al. | |
| 5,689,694 A | 11/1997 | Funyu | |
| 5,715,435 A | 2/1998 | Ikei | |
| 5,724,505 A | 3/1998 | Argade et al. | |
| 5,748,904 A | 5/1998 | Huang et al. | |
| 5,751,942 A | 5/1998 | Christensen et al. | |
| 5,752,013 A | 5/1998 | Christensen et al. | |
| 5,758,112 A * | 5/1998 | Yeager et al. | 712/217 |
| 5,764,885 A | 6/1998 | Sites et al. | |
| 5,790,561 A | 8/1998 | Borden et al. | |
| 5,802,272 A | 9/1998 | Sites et al. | |
| 5,812,868 A | 9/1998 | Moyer et al. | |
| 5,832,515 A | 11/1998 | Ledain et al. | |
| 5,848,264 A | 12/1998 | Baird et al. | |
| 5,878,208 A | 3/1999 | Levine et al. | |
| 5,903,740 A * | 5/1999 | Walker et al. | 712/217 |
| 5,944,841 A | 8/1999 | Christie | |
| 5,946,486 A | 8/1999 | Pekowski | |
| 5,970,246 A | 10/1999 | Moughani et al. | |
| 5,978,937 A | 11/1999 | Miyamori et al. | |
| 5,996,092 A | 11/1999 | Augsburg et al. | |
| 6,009,270 A | 12/1999 | Mann | |
| 6,012,085 A | 1/2000 | Yohe et al. | |
| 6,032,268 A | 2/2000 | Swoboda et al. | |
| 6,055,630 A * | 4/2000 | D'Sa et al. | 712/240 |
| 6,061,473 A | 5/2000 | Chen et al. | |
| 6,094,729 A | 7/2000 | Mann | |
| 6,106,573 A | 8/2000 | Mahalingaiah et al. | |
| 6,145,123 A | 11/2000 | Torrey et al. | |
| 6,247,143 B1* | 6/2001 | Williams | 714/11 |
| 6,256,777 B1 | 7/2001 | Ackerman | |
| 6,282,701 B1 | 8/2001 | Wygodny et al. | |
| 6,314,530 B1 | 11/2001 | Mann | |
| 6,338,159 B1 | 1/2002 | Alexander | |
| 6,353,924 B1 | 3/2002 | Ayers et al. | |
| 6,457,144 B1 | 9/2002 | Eberhard | |
| 6,467,083 B1 | 10/2002 | Yamashita | |
| 6,487,715 B1 | 11/2002 | Chamdani et al. | |
| 6,530,076 B1 | 3/2003 | Ryan et al. | |
| 6,615,370 B1 | 9/2003 | Edwards et al. | |
| 6,615,371 B1 | 9/2003 | McCullough et al. | |
| 6,658,649 B1 | 12/2003 | Bates et al. | |
| 6,684,348 B1 | 1/2004 | Edwards et al. | |
| 6,687,865 B1 | 2/2004 | Dervisoglu et al. | |
| 6,694,427 B1* | 2/2004 | Mericas et al. | 712/227 |
| 6,754,804 B1 | 6/2004 | Hudepohl et al. | |
| 6,772,324 B1* | 8/2004 | Akkary et al. | 712/235 |
| 6,834,360 B1 | 12/2004 | Corti et al. | |
| 6,883,162 B1* | 4/2005 | Jackson et al. | 717/124 |
| 6,928,533 B1* | 8/2005 | Eisen et al. | 712/218 |
| 2001/0054175 A1 | 12/2001 | Watanabe | |
| 2002/0046393 A1 | 4/2002 | Leino et al. | |
| 2002/0147965 A1 | 10/2002 | Swaine et al. | |

FOREIGN PATENT DOCUMENTS

| | | |
|---|---|---|
| GB | 2 329 049 | 10/1999 |

OTHER PUBLICATIONS

MIPS64 5Kc™ Processor Core Datasheet, Revision 1.7.5, pp. 1-40, Aug. 11, 2000.
MIPS64 5Kc™ Processor Core Datasheet, Revision 2.0, pp. 1-44, Aug. 28, 2000.
MIPS64™ 5Kf™ Processor Core Datasheet, Revision 00.11, pp. 1-44, Mar. 30, 2001.
MIPS64 5Kc™ Processor Core Software User's Manual, Revision 2.2, pp. 1-580, Aug. 11, 2000.
F. Chow et al., "Engineering a RISC Compiler System," *IEEE COMP-CON*, Mar. 1986, pp. 132-137.
Faloutsos, Christos et al., "Description and Performance Analysis of Signature File Methods for Office Filing", ACM Transactions on Office Information Systems, (Jul. 1987), 5:3:237-257.
Susan J. Eggers, et al., "Techniques for Efficent Inline Tracing on a Shared-Memory Multiprocessor," University of Washington, *1990 ACM*, pp. 37-47.
M.D. Smith, "Tracing with Pixie," *Technical Report CSL-TR-91-497*, Stanford University, Computer Systems Laboratory, Nov. 1991, pp. 1-29.
ATOM Reference Manual, *Digital Equipment Corporation*, Massachusetts, Dec. 1993, pp. 1-32.
A. Srivastaba et al., "ATOM: A System for Building Customized Program Analysis Tools," *WRL, Research* Report 94/2, Digital Equipment Corporation, Massachusetts, Mar. 1994, pp. 1-23.
ATOM User Manual, Digital Equipment Corporation, Mar. 1994, pp. 1-28.
B. Cmelik et al., "Shade: A Fast Instruction-Set Simulator for Execution Profiling," *Proceedings of the 1994 ACM SIGMETRICS Conference*, SIGMETRICS, California, May 1994, pp. 128-137.
Richard A. Uhlig, et al., "Trace-Driven Memory Simulation: A Survey," Intel Microcomputer Research Lab; University of Michigan, *ACM Computer Surveys*, vol. 29, No. 2, Jun. 1997, pp. 128-170.
Eric Rotenberg, et al., "Trace Processors," University of Wisconsin, 1997 IEEE Service Center, 12 pp.
E.N. Elnozahy, "Address Trace Compression Through Loop Detection and Reduction," © 1999 ACM 1-58113-083, pp. 214, 215.
Embedded Trace Macrocell Specification, Rev. 0/0a, ARM IHI 0014C, ARM Ltd. (1999).
MIPS Technologies; "MIPS64™ 5K™ Processor Core Family Integrator's Guide;" [Document No. MD00106]; © *1999-2001 MIPS Technologies, Inc.* ; Rev. 02.00; Jan. 15, 2001; pp. 1-VIII, 1-75.
MIPS64 5Kc™ Processor Core Datasheet, Revision 1.7.4, pp. 1-40, Dec. 14, 1999.
Darren Jones, "Opal Coprocessor Interface," *MIP Propietary/Confidential*, Jun. 4, 1999, pp. 1-18.
Darren Jones, *MIPSS64™ 5KC™ Processor Cores User's Manual*, Rev. 1.0, Jul. 4, 1999, pp. 6-1 to 6-26.
*MIPSS64™ 5KC™ Processor Cores User's Manual*, Rev. 1.0.1., 1999, pp. 247-276.
Embedded Trace Macrocell, (Rev. 1) Specification, (2000).
MIPS64 5Kc™ Processor Core Datasheet, Revision 1.7.5, pp. 1-40, Aug. 11, 2000.
MIPS64 5Kc™ Processor Core Datasheet, Revision 2.0, pp. 1-44, Aug. 28, 2000.
MIPS64™ 5Kf™ Processor Core Datasheet, Revision 00.11, pp. 1-44, Mar. 30, 2001.
MIPS64 5Kc™ Processor Core Software User's Manual, Revision 2.2, pp. 1-580, Aug. 11, 2000.
MIPS Technologies; "MIPS64™ 5K™ Processor Core Integrator's Guide," [Document No. MD00056]; *MIPS Technologies, Inc.*; Rev. 1.2; Aug. 11, 2000; pp. 1-11, 1-82.
MIPS Technologies; "Core Processor Interface Specification;" [Document No. MD00068]; *MIPS Technologies, Inc.*; Rev. 1.11; Mar. 30, 2001; pp. 1-26.
U.S. Appl. No. 09/751,747, filed Dec. 29, 2000, Hudepohl et al.
U.S. Appl. No. 09/751,748, filed Dec. 29, 2000, Hudepohl et al.
U.S. Appl. No. 09/844,671, filed Apr. 30, 2001, Thekkath et al.
U.S. Appl. No. 09/844,669, filed Apr. 30, 2001, Thekkath.
U.S. Appl. No. 09/894,832, filed Jun. 29, 2001, Thekkath et al.
U.S. Appl. No. 09/844,668, filed Apr. 30, 2001, Thekkath et al.
U.S. Appl. No. 09/844,672, filed Apr. 30, 2001, Thekkath.
U.S. Appl. No. 09/844,673, filed Apr. 30, 2001, Thekkath.
U.S. Appl. No. 09/844,271, filed Apr. 30, 2001, Thekkath.
U.S. Appl. No. 09/894,831, filed Jun. 29, 2001, Treue et al.
U.S. Appl. No. 09/894,830, filed Jun. 29, 2001, Treue et al.
U.S. Appl. No. 09/844,670, filed Apr. 30, 2001, Thekkath.

* cited by examiner

| Instr. No. | PC | Instruction | Graduation Cycle | Trace Bus Number |
|---|---|---|---|---|
| 1 | 0x00400188 | SW $6, 0xe170($1) | N+0 | 0 |
| 2 | 0x0040018c | SW $4, 0xb134($28) | N+1 | 0 |
| 3 | 0x00400190 | SW $5, 0xb130(gp/$28) | N+2 | 0 |
| 4 | 0x00400194 | SW $0, 0x1c($29) | N+3 | 0 |
| 5 | 0x00400198 | JAL 0x418d9c | N+4 | 0 |
| 6 | 0x0040019c | OR $30, $0, $0 | N+4 | 1 |
| 7 | 0x00418d9c | NOP | N+5 | 0 |
| 8 | 0x00418da0 | JR $31 | N+5 | 1 |
| 9 | 0x00418da4 | NOP | N+6 | 0 |
| 10 | 0x004001a0 | JAL 0x411c40 | N+7 | 0 |
| 11 | 0x004001a4 | NOP | N+7 | 1 |
| 12 | 0x00411c40 | JR $31 | N+8 | 0 |
| 13 | 0x00411c44 | NOP | N+8 | 1 |
| 14 | 0x00414adc | LW $4, 0xb134($28) | N+9 | 0 |
| 15 | 0x00414ae0 | BEQ $14, $0, 0x414af8 | N+9 | 1 |
| 16 | 0x00414ae4 | ADDIU $29, $29, 0xffe0 | N+10 | 0 |
| 17 | 0x00414af8 | OR $7, $0, $0 | N+10 | 1 |
| 18 | 0x00414afc | NOP | N+11 | 0 |
| 19 | 0x00414b00 | ADDU $6, $6, $2 | N+11 | 1 |
| 20 | 0x00414b04 | OR $7, $2, $0 | N+12 | 0 |
| 21 | 0x00414b08 | SLTU $1, $2, $1 | N+12 | 1 |

FIG. 10

```
Program Sequence
ILBa
ILb
ISc
ILd
```

*FIG. 11*

| PDO_InsComp_0 | PDO_InsComp_1 | cycle |
|---|---|---|
| ILBa | ILb | n |
| ISc | ILd | n+1 |

*FIG. 12*

```
(
Data in Progran Sequence
TPCa1, TPCa2,
TLAa1, TLAa2,
TLAb1,
TDa1, TDa2,
TDb1, TDb2,
TSAc1, TSAc2,
TLAd1,
TDc1, TDc2,
TDd1, TDd2
```

*FIG. 14*

| Cycle | PDO_AD_0 | PDO_AD_1 | PDO_TEnd_0 | PDO_TEnd_1 | Comments |
|---|---|---|---|---|---|
| m+0 | TPCa1 | NT | 0 | x | |
| m+1 | TPCa2 | NT | 1 | x | |
| m+2 | TLAa1 | NT | 0 | x | |
| m+3 | TLAa2 | TLAb1 | 1 | 1 | |
| m+4 | TDa1 | TDb1 | 0 | 0 | |
| m+5 | TDa2 | TDb2 | 1 | 1 | completion of all _AD transfers for instructions traced in cycle n |
| m+6 | TSAc1 | NT | 0 | x | |
| m+7 | TSAc2 | TLAd1 | 1 | 1 | |

| Cycle | PDO_AD_0 | PDO_AD_1 | PDO_TEnd_0 | PDO_TEnd_1 | Comments |
|---|---|---|---|---|---|
| m+8 | TDc1 | TDd1 | 0 | 0 | |
| m+9 | TDc2 | TDd2 | 1 | 1 | completion of all _AD transfers for instructions traced in cycle n+1 |

FIG. 13

SYSTEM AND METHOD TO TRACE HIGH PERFORMANCE MULTI-ISSUE PROCESSORS

FIELD OF THE INVENTION

The present invention relates generally to on-chip debugging, and more specifically to program counter (PC) and data tracing in embedded processor systems.

BACKGROUND OF THE INVENTION

Computer systems process information according to a program that includes a sequence of instructions defined by an application program or an operating system. Typically, a program counter provides a series of memory addresses that are used by the processor for fetching instructions stored in the associated memory. In this process, the processor conveys the memory address to the memory over an address bus, and the memory responds over an instruction/data bus with the instruction stored in the addressed memory location. The instructions stored in the memory constitute the program to be executed.

Program development relies heavily on the verification of the instructions stored in memory as well as their corresponding execution. Typically, these debug efforts are supported by instruction tracing tools that generate a listing of executed instructions during the execution of a program.

The increased control and flexibility in the generation of tracing data is particularly important for the embedded processor industry. In the embedded processor industry, specialized on-chip circuitry is often combined with a processor core. However, high performance processors may include features that make it difficult to trace sequential execution of a program. For example, a multi-issue processor may have out-of-order (OOO) dynamic scheduling, deep pipelines, multi-latency pipelines, or support of outstanding load misses.

SUMMARY

Broadly speaking, embodiments of the present invention include an apparatus, system, method, computer program product, and data signal embodied in a transmission medium for tracing multi-issue processors in program sequence order. In one embodiment, tracing instructions from a multi-issue processor includes: monitoring a reorder buffer having a graduation cycle for graduating instructions in program order and transmitting trace data for the instructions in graduation order for each graduation cycle along with information that enables a determination of program execution of the instructions. The trace data may be transmitted using a trace interface having a plurality of trace buses. In one embodiment, one or more rules are used to assign trace data to the trace buses to facilitate another element reconstructing the program sequence.

One benefit of the present invention is that it facilitates tracing a complex multi-issue microprocessor having one or more features that may disrupt sequential execution of instructions, such as deep pipelines, multi-latency pipelines, multiple outstanding load misses, out-of-order (OOO) instructions, or superscalarity.

DETAILED DESCRIPTION

Embodiments of the invention are discussed in detail below. While specific implementations are discussed, it should be understood that this is done for illustration purposes only. A person skilled in the relevant art will recognize that other components and configurations may be used without departing from the spirit and scope of the invention.

Figure 1:
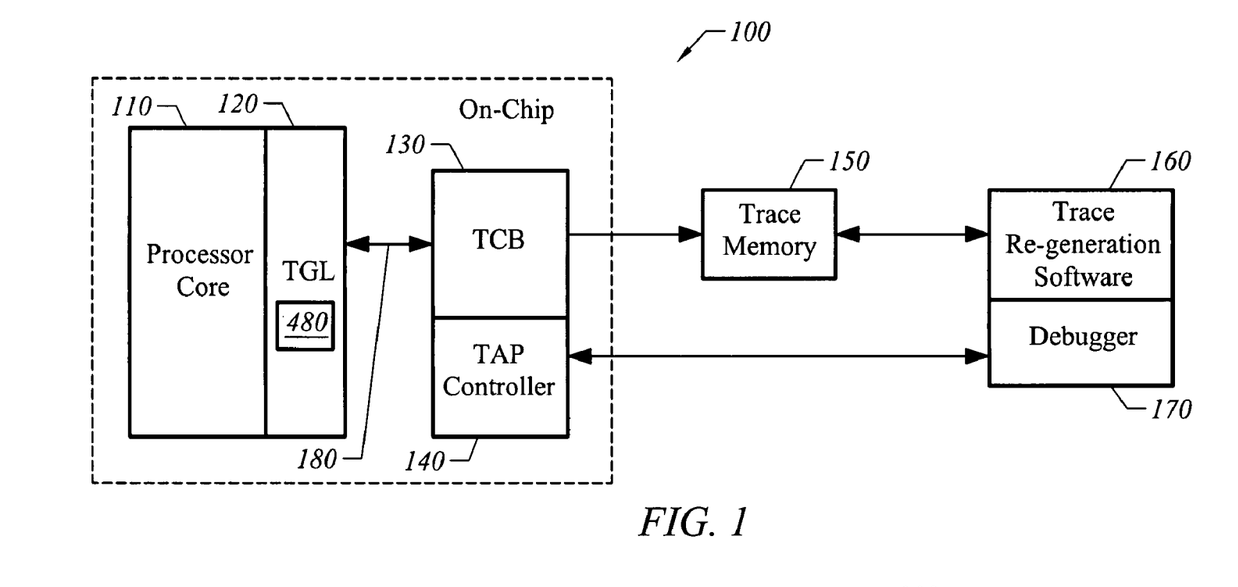
FIG. 1 illustrates a tracing system according to an embodiment of the present invention.

FIG. 1 illustrates a tracing system 100 that includes on-chip components identified as microprocessor core 110, trace generation logic (TGL) 120, trace control block (TCB) 130, and test access port (TAP) controller 140. TGL 120 can be embodied as part of microprocessor core 110. TGL 120 is generally operative to generate program counter (PC) and data trace information based on the execution of program code in one or more pipelines within microprocessor core 110. In some embodiments, microprocessor core is a high performance multi-issue microprocessor having one or more features that may disrupt sequential execution of instructions, such as deep pipelines, multi-latency pipelines, multiple outstanding load misses, out-of-order (OOO) instructions, or superscalarity.

TGL 120 transmits the generated trace information to TCB 130 via trace interface 180. As described below in more detail, TGL 120 includes logic 480 to monitor a reorder buffer associated with multiple instruction pipelines (not shown in FIG. 1) of processor core 110. TCB 130 captures the trace information that is provided by TGL 120 on trace interface 180 and writes the trace information to trace memory 150 in accordance with a particular set of requirements of trace re-generation software 160. As described below in more detail, trace interface 180 includes trace buses for transmitting trace data and TGL may be adapted to apply one or more rules for outputting trace data on trace interface 180 to facilitate transmitting sufficient information to TCB 130 to reconstruct the program execution.

Also included on-chip is TAP controller 140. TAP controller 140 includes instruction, data, and control registers as well as circuitry that enables tap controller 140 to access internal debug registers and to monitor and control the microprocessor core's address and data buses. In one embodiment, TAP controller 140 is based on the extended JTAG (EJTAG) specification developed in part by MIPS Technologies, Inc.

The trace information stored in trace memory 150 can be retrieved through trace regeneration software 160. Trace regeneration software 160 is a post-processing software module that enables trace reconstruction. Debugger 170 interfaces with TAP controller 140 and is generally operative to display TAP states as well as provide high-level commands to TAP controller 140. For example, debugger 170 can be used to set breakpoints or examine contents of certain sections of memory.

Figure 2:
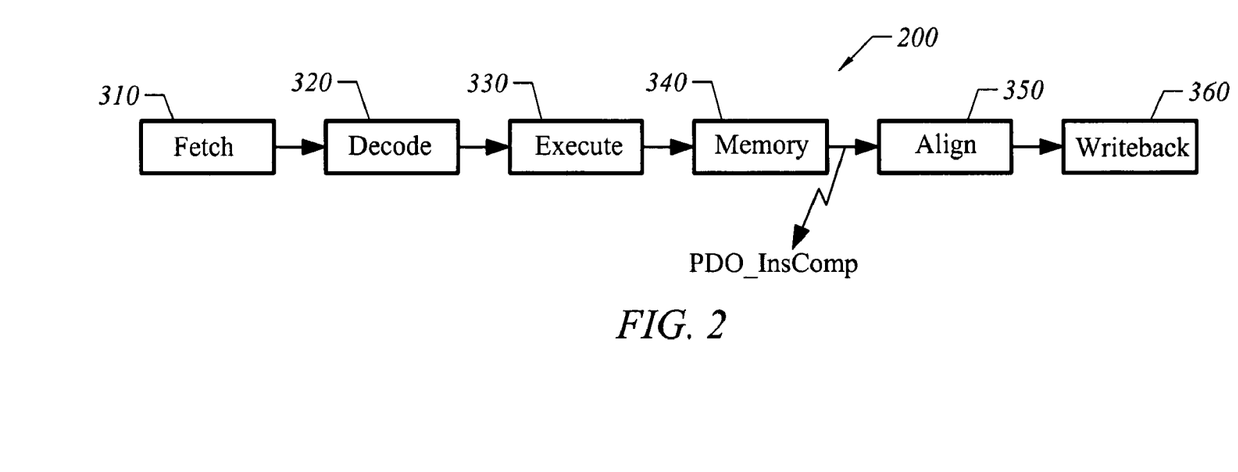
FIGS. 2 and 3 illustrate aspects of tracing a single instruction pipeline according to an embodiment of the present invention.

Some aspects of the present invention may be understood with regards to a single instruction pipeline. FIG. 2 illustrates a single instruction pipeline 200 having six stages, labeled as fetch stage 310, decode stage 320, execute stage 330, memory stage 340, align stage 350, and writeback stage 360. In a single instruction pipeline, a tracing point may be placed after any stage beyond which instructions are certain to execute, such as after memory stage 340.

Figure 3:
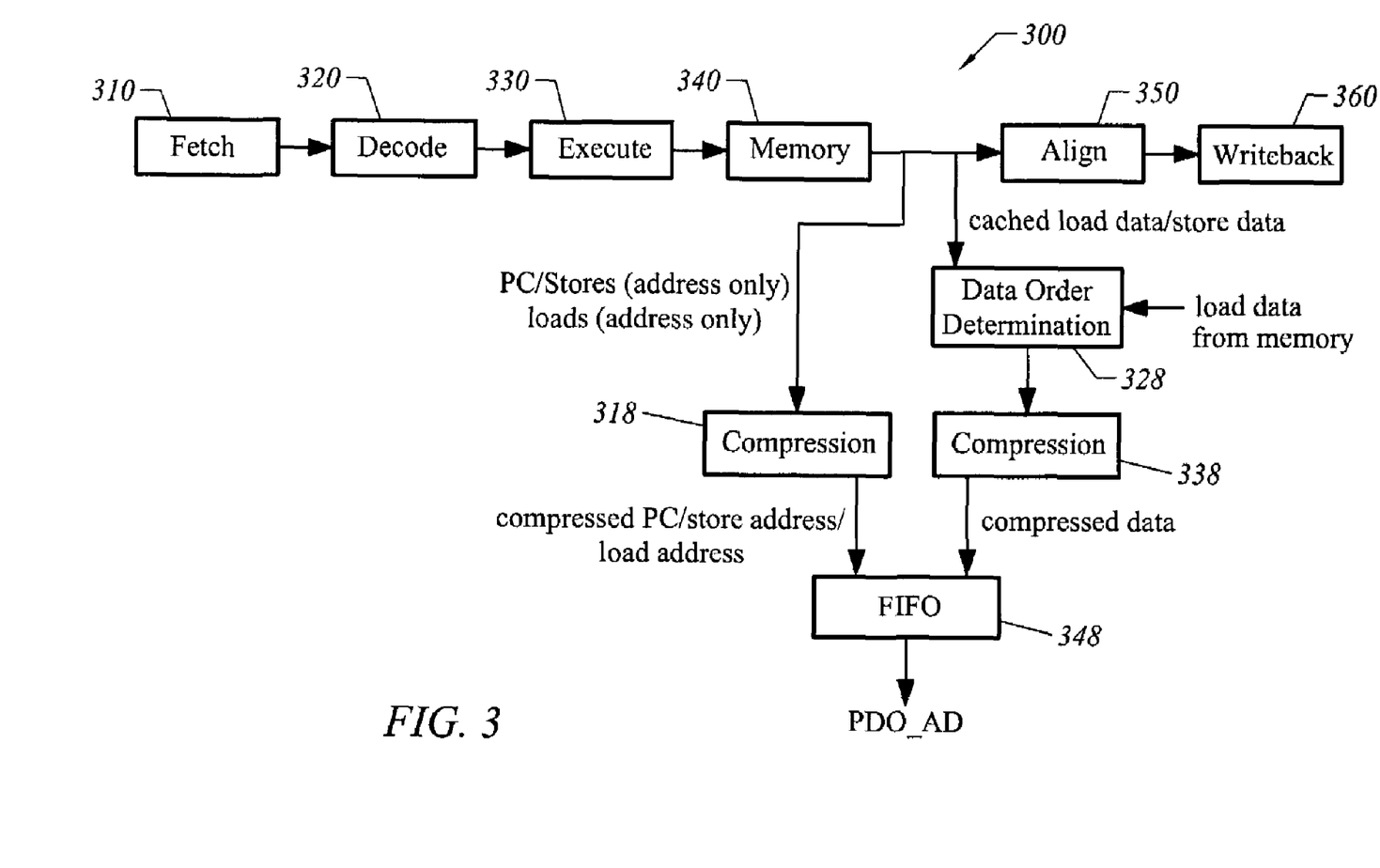

FIG. 3 illustrates a single instruction pipeline having an associated data-order determination module 328, compression modules 318 and 338, and a FIFO queue 348. The deferred transmission of load and store data is enabled through the output of a data order signal that is designed to signal the out-of-order nature of load and store data. In the illustrated embodiment, the PC, store address, and load address are immediately provided to compression module 318. Store data and load data, on the other hand, are provided to compression modules 318 and 338 only when the data is available to data order determination module 328. If the data is retrieved from cache/register, then the data is immediately available to data order determination module 328. The data can then be passed on to compression modules. On the other hand, if say the load data is requested from memory (say due to a cache miss), then the load data is not immediately available to data order determination module 328. In general, compression modules 318 and 338 are operative to compress the trace data that is to be placed into FIFO 348, thereby awaiting output onto a trace bus.

In a multi-issue pipeline, instructions may be issued out of order, i.e. out of program sequence. Even if instructions are not issued out of order, they may complete their execution out of order. This can happen when pipelines have different latencies or because of cache misses. To ensure correct executions of the program, the instructions are typically put back in order at the back-end of the pipeline in a structure called the reorder buffer.

Figure 4:
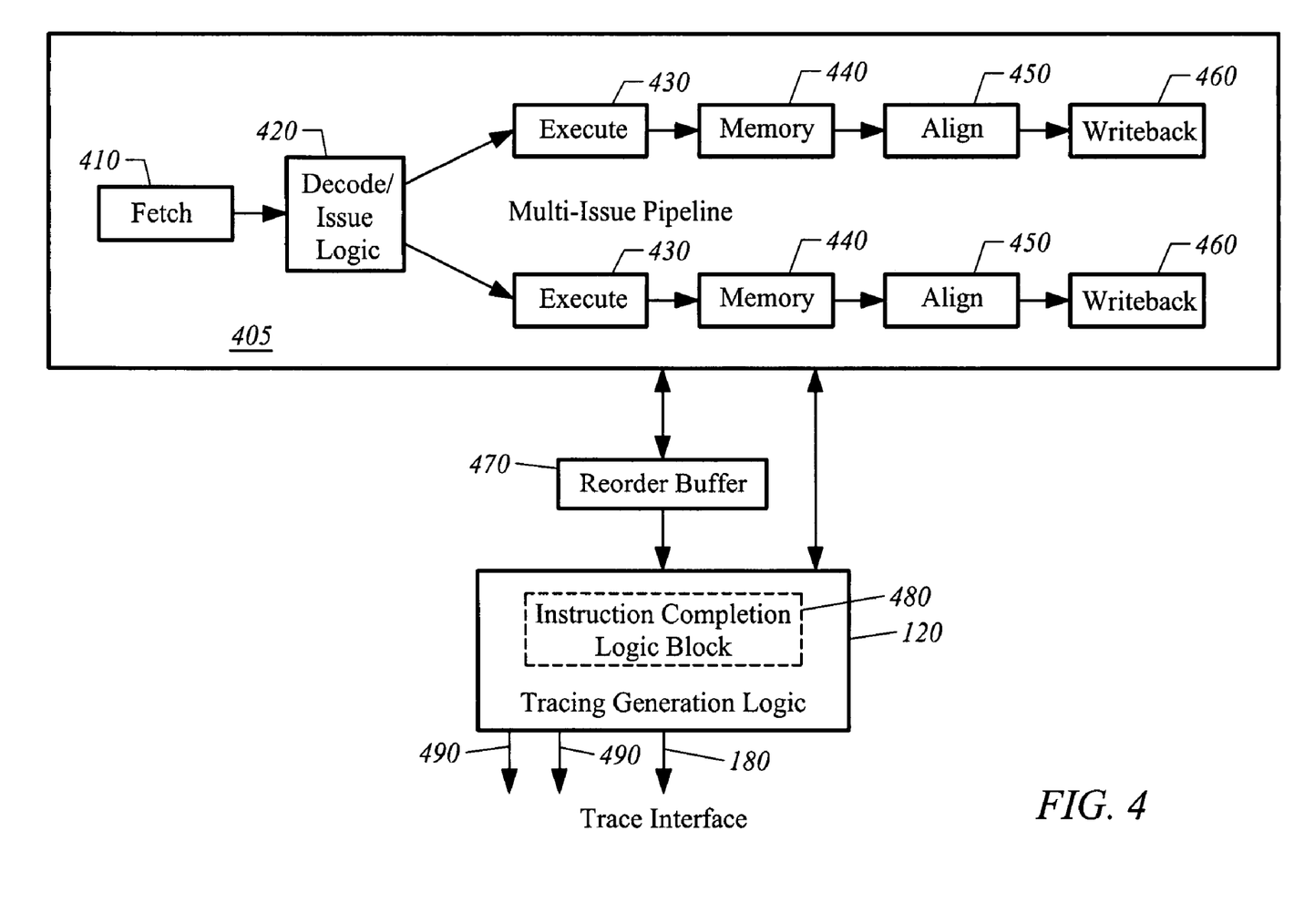
FIG. 4 illustrates a portion of a multi-issue processor tracing apparatus according to an embodiment of the present invention.

In one embodiment of the present invention instructions are traced out from a reorder buffer. FIG. 4 is a block diagram illustrating some aspects of an embodiment of an on-chip tracing apparatus 400 for tracing multi-issue processor. A multi-issue processor may comprise processors 405 of processor core 110 that include at least two instruction pipelines, such as instruction pipelines including a plurality of stages, such as a fetch stage 410, decode stage 420, execute stage 430, memory stage 440, align stage 450, and writeback stage 460 and issue queue 470 and issue logic 475 having issue slots for each pipeline. For the purposes of illustration, two pipelines are shown, although it will be understood that processors 405 may have any number of instruction pipelines.

TGL 120 is communicatively coupled to reorder buffer 470 and is adapted to monitor graduating instructions from a reorder buffer 470. In one implementation, TGL 120 includes an instruction completion logic block module 480 to monitor the graduation of instructions from a reorder buffer 470 associated with instruction pipeline 405. For the purposes of illustration, reorder buffer 470 is shown as a separate element from instruction pipelines 405 although it will be understood that reorder buffer 470 is commonly considered to be a component of instruction pipelines 405.

Reorder buffer 470 is responsible for putting the issued instructions back in program sequence order. The reorder buffer holds instructions that complete out-of order and graduates them in-order, i.e., commits their results in-order. The reorder buffer is located at a point in the pipeline where it is certain that the instruction will not stop and can proceed to completion. This is typically at a point where it is certain that the instruction will not get an exception or be nullified for any reason.

The number of graduating instructions per cycle will typically not exceed the number of issue slots of the processor (e.g., 0, 1, or 2 instructions per graduation cycle for a two-issue multiprocessor). However, more generally, the maximum number of graduating instructions will range from zero to the number of issue slots at the front of the multi-issue pipeline plus the number of load miss completions from the bus and cache units.

Figure 5:
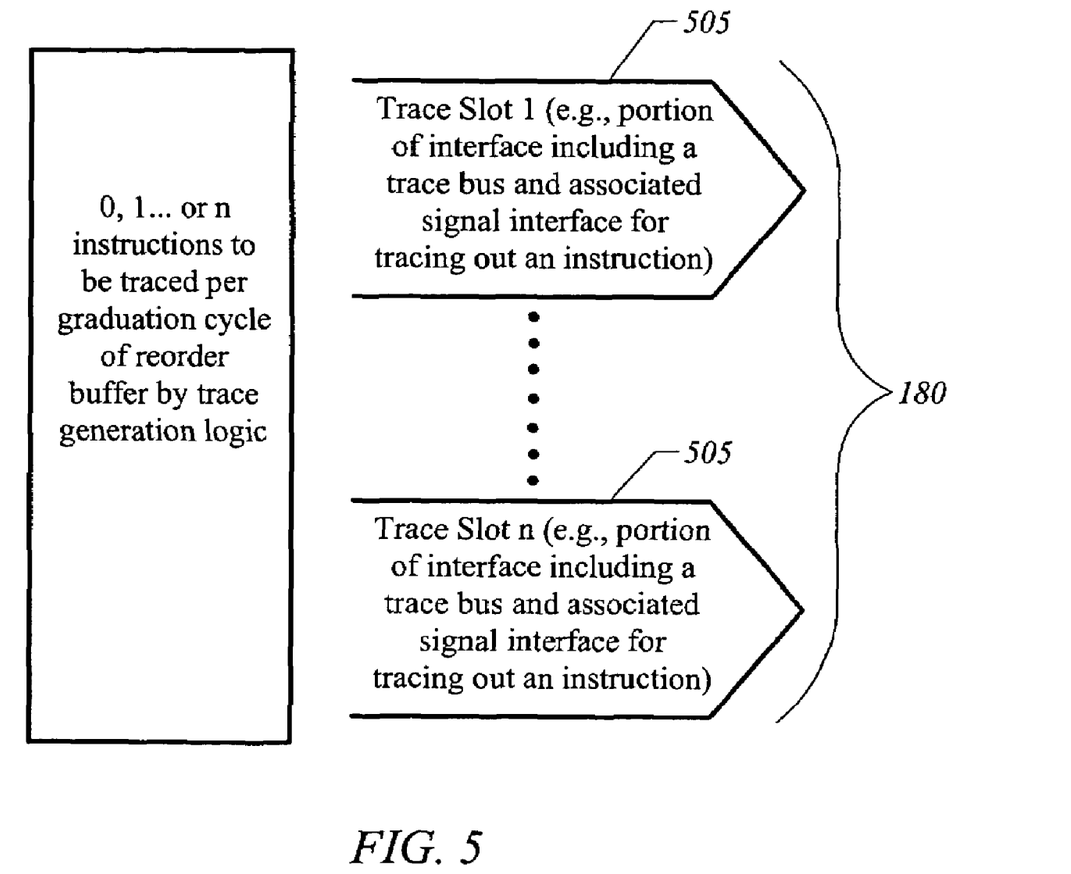
FIG. 5 illustrates an embodiment of a present invention in which a trace interface includes a plurality of trace slots.

TGL 120 monitors instructions at the point of graduation and traces them out on output trace buses 490. Thus, instructions may be traced in program sequence order from a multi-issue processor. Since the maximum number of instructions that may graduate each cycle is typically equal to or greater than the number of issue slots, the number of trace slots (e.g., the number of different portions of trace interface 180 able to simultaneously transmit instruction data) is preferably at least equal to the number of issue slots. Referring to FIG. 5, each trace slot 505 of trace interface 180 thus includes a trace bus for outputting trace data and other associated signals for tracing out an instruction. In one embodiment the number of trace slots is selected to be equal to the number of issue slots. Thus, in one embodiment of a two-issue multiprocessor, trace interface 180 includes at least two output trace buses 490. It is possible that in some cycles the number of graduating instructions is greater than the number of instruction trace slots. In this case, the TGL 120 may include a buffer to buffer the instructions(s) that could not be traced earlier, and trace them during the next cycle, with other instructions intergraduate in that cycle, while still maintaining the program sequence order.

Figure 6:
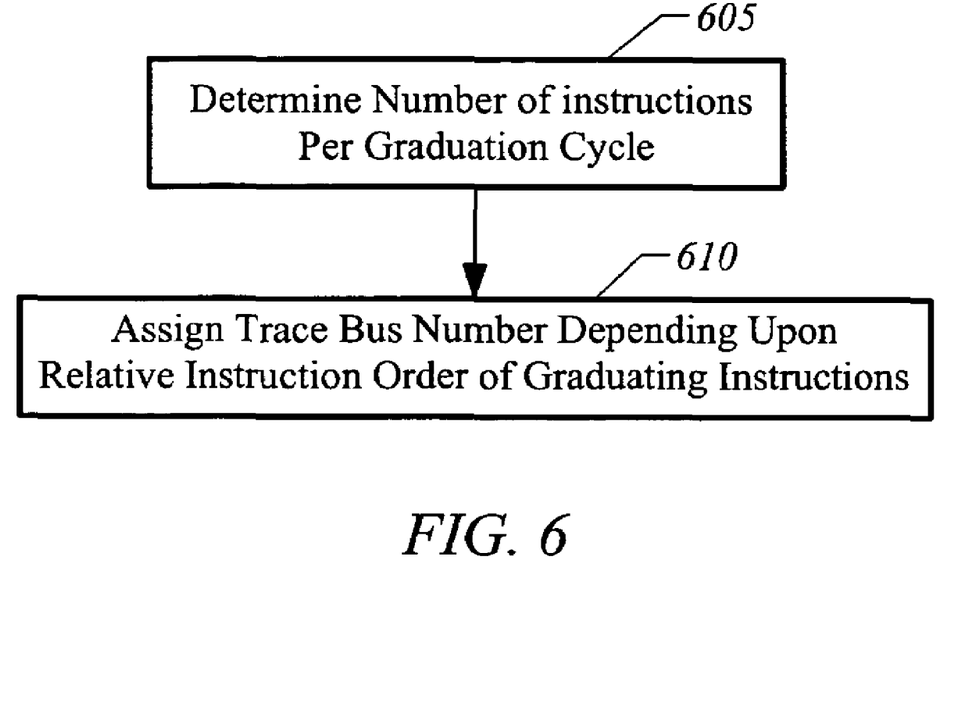
FIG. 6 is a flow chart illustrating one embodiment of a rule that trace generation logic may use to assign trace buses to graduating instructions.

As previously described, TCB 130 requires sufficient information to permit the sequential program execution to be reconstructed. Consequently, TGL 120 outputs trace information on trace interface 180 in a format that facilitates reconstructing sequential program execution (e.g., by TRS 160) from information received by two or more trace buses over multiple graduation cycles. Embodiments of the present invention include at least one tracing rule to facilitate reconstructing sequential program execution. One tracing rule is a bus order rule. With multiple trace buses, the TGL 120 maintains a bus order rule, which dictates that during each cycle, instructions are assigned to trace buses such that the relative instruction order may be determined from the trace bus order. For example, referring to the flow chart of FIG. 6, in one embodiment TGL 120 determines 605 the number of instructions graduating per cycle and assigns 610 these instructions to trace buses depending upon their relative program order. In a preferred embodiment, this assignment of instructions to trace buses is static, i.e., the earliest instruction is traced on trace bus 0, the next on trace bus 1, and so on. Alternatively, in another embodiment, this assignment can be dynamic, with the mapping being transmitted each cycle as well.

Figure 7:
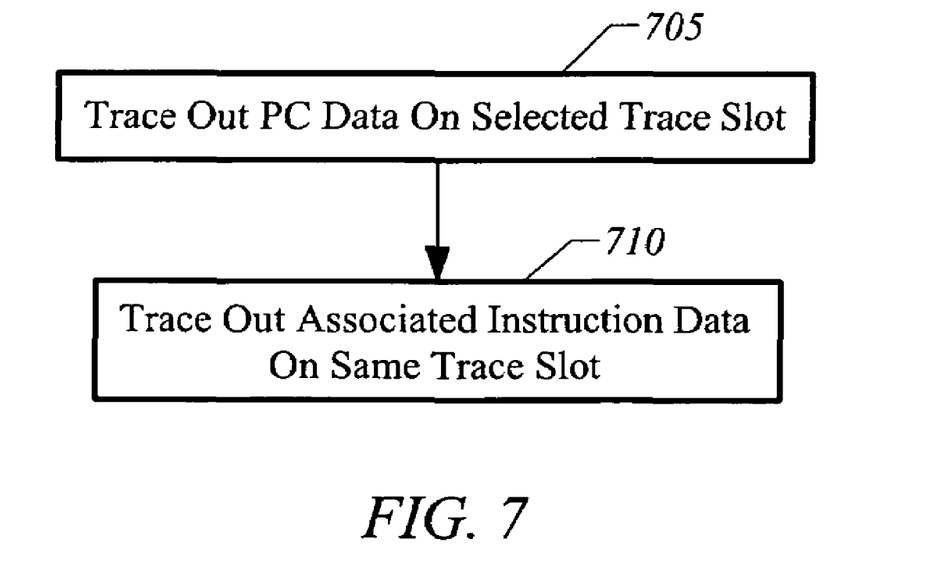
FIG. 7 is a flow chart illustrating an embodiment of a rule that trace generation logic may use in which data associated with an instruction is traced out on the same trace slot.

To reconstruct program sequence execution, another tracing rule is that if an instruction is traced on a particular instruction trace slot (i.e., a particular output trace bus 490) then all other information for that instruction is sent on the signals of the same instruction trace slot. For example, referring to FIG. 7 in one embodiment if the PC is output 705 on a trace bus, the other associated data, such as load address, load data, store address, and store data are traced out 710 on the same trace bus (in subsequent clock cycles). This rule facilitates TCB 130 to associate and gather all the information relating to a particular instruction. The exception to this occurs when the load or store data is not immediately available, such as if a load misses in the cache. In this situation, the data is sent at a later time on any free trace bus, using an out of order data signal as described below in more detail.

Figure 8:
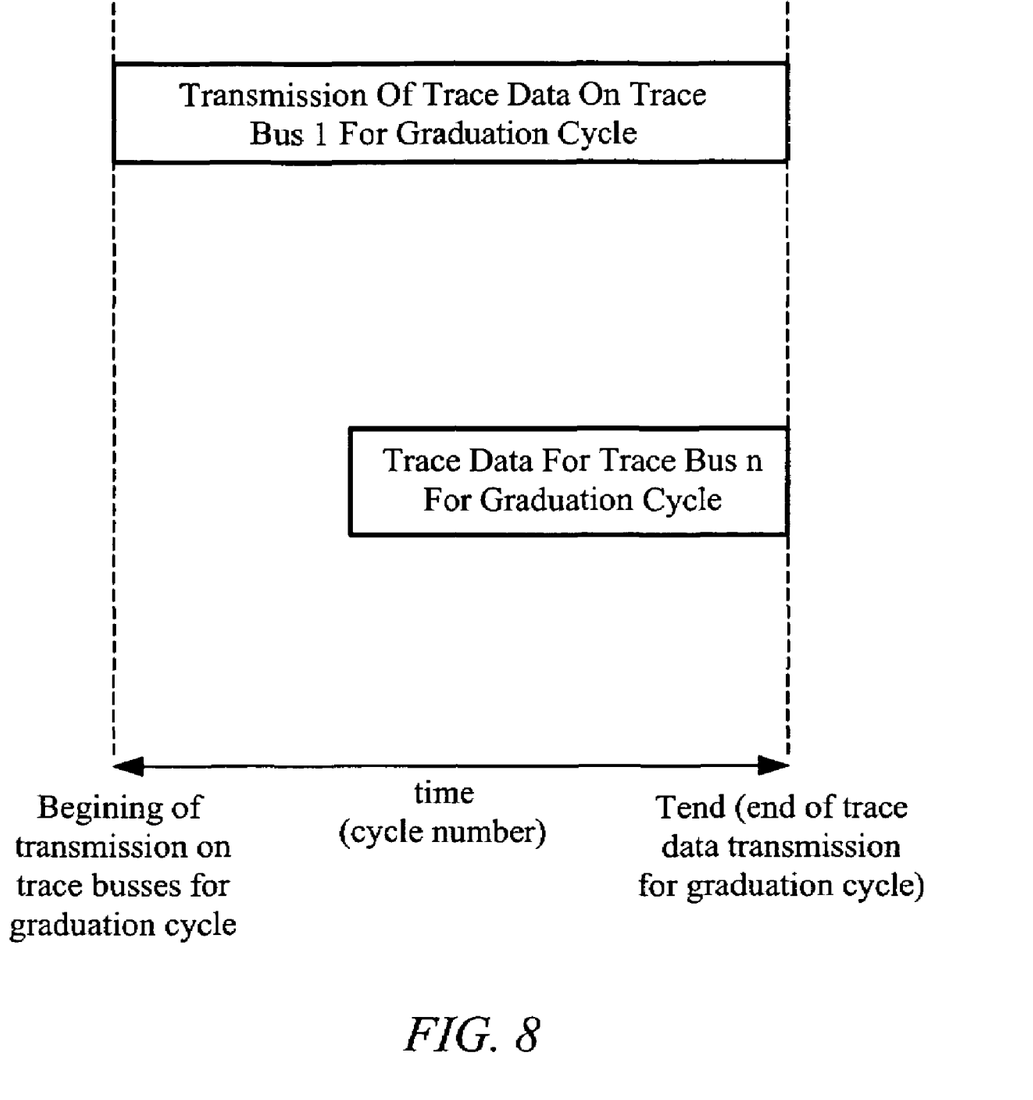
FIG. 8 illustrates a method of coordinating an end time signal for the case that data from a plurality of graduating instructions are traced out on a plurality of trace buses.

Referring to FIG. 8, another tracing rule is applied to facilitate the TCB 130 to gather data on a per-instruction basis to determine the program sequence. This rule coordinates the end cycle of data transfers of the instructions that began tracing together on the same cycle. As described below in more detail, some types of data may be transmitted on each trace bus in one or more clock cycles. With a plurality of trace buses, a transaction end coordination rule facilitates sequencing data from the trace buses in proper order. In one embodiment, end signals, illustrated as Tend signals in FIG. 8, are coordinated on each trace bus for the data associated with instructions that began their tracing cycle together.

In a preferred embodiment the three above-described tracing rules are utilized together in combination. However, it will also be understood that embodiments of the present invention include using a subset of the three tracing rules (i.e., one or two of the tracing rules).

Having described the general components of tracing system 100, a detailed description of one embodiment of a trace interface 180 is now described to illustrate in more detail one embodiment of a method of multi-issue tracing. Trace interface 180 may comprise a set of input and output signals from microprocessor core 110. A "PDO_" prefix may be used to identify signals belonging to the output interface from TGL 120, while a "PDI_" prefix may be used to identify signals belonging to the input interface to TGL 120. For a multi-issue pipeline, the trace interface may have one output trace bus for each instruction pipeline. The output signal names described may further have a "_n" appended to the signal name to designate a pre-determined trace slot. For example, a two-issue microprocessor core may use the signals PDO_InsComp_0 and PDO_InsComp_1 to represent the instruction completion status values of two simultaneously graduating instructions.

An exemplary set of output signals includes the signals listed in Table 1, below. PDO_IamTracing is a signal, sent out from TGL 120 that indicates that the rest of the Out signals represent valid trace data. In effect, PDO_IamTracing represents an enable signal for the rest of the Out signals. The PDO_InsComp signal is an instruction completion status signal. PDO_AD is a trace bus for transmitting trace data. PDO_Ttype specifies the transmission type for the transaction on the trace bus. The end of a particular transaction on a trace bus is indicated by a PDO_Tend signal. A PDO_Tmode may be included to indicate the mode of the transmission. A PDO_DataOrder signal is used to provide information on out-of-order data. A PDO_Overflow signal may be used to indicate an overflow error. A PDO_Issue_Tag_n signal is used to provide information on instructions that are issued together. The elements of Table 1 are described below in more detail.

TABLE 1

| Output Signal Name | Description |
| --- | --- |
| PDO_IamTracing | Global enable signal for signals output from the microprocessor core |
| PDO_InsComp_n | Instruction completion status signal for the nth instruction pipeline |
| PDO_AD_n | The nth trace bus for trace data |
| PDO_Ttype_n | Specifies the transmission type for the transaction on the PDO_AD lines for the nth trace bus. |
| PDO_Tend_n | Indicates the last cycle of the current transaction |
| PDO_TMode | Indicates the transmission mode for the bits transmitted on PDO_AD |
| PDO_DataOrder_n | Indicates the out-of-order-ness of load and store data |
| PDO_Overflow | Indicates an internal FIFO overflow error |
| PDO_Issue_Tag_n | Indicates the instructions with matching tag values have issued together in the multi-issue pipelines |

PDO_InsComp_n is an instruction completion status signal that is used as an indicator of completed instructions and their type in the processor's pipeline. In one embodiment, PDO_InsComp n can take on the values of Table 2.

TABLE 2

| PDO_InsComp | Description |
| --- | --- |
| 000 | No instruction completed this cycle (NI) |
| 001 | Instruction completed this cycle (I) |
| 010 | Instruction completed this cycle was a load (IL) |
| 011 | Instruction completed this cycle was a store (IS) |
| 100 | Instruction completed this cycle was a PC sync (IPC) |
| 101 | Instruction branched this cycle (IB) |
| 110 | Instruction branched this cycle was a load (ILB) |
| 111 | Instruction branched this cycle was a store (ISB) |

A PDO_InsComp value '000' is associated with a No Instruction complete (NI) indication. In one example, the NI indication can be used when the instruction pipeline is stalled. In another example, the NI indication can be used when an instruction is killed due to an exception.

The PDO_InsComp values '001,' '010,' and '011' are associated with the completion of instructions within a basic block or predictable jumps and branches to the next basic block. Specifically, '001' is used to signal the completion of a regular instruction (I), '010' is used to signal the completion of a load instruction (IL), and '011' is used to signal the completion of a store instruction (IS). As the I, IL, or IS indication is associated with the completion of an instruction within a basic block, the PC value of the I, IL, or IS instruction need not be traced.

When a PDO_InsComp indicates a store in the completing instruction, the store address and data is also transmitted provided that the user requires those values to be traced. Similarly, when PDO_InsComp indicates a load in the completing instruction, the load address and data is also transmitted provided that the user requires those values to be traced. In general, if the load instruction hits in the cache, then the trace data for the load instruction is transmitted in a similar manner to the trace data for a store instruction.

The completion of branch instructions are signaled using the PDO_InsComp values of '101,' '110,' and '111.' Specifically, '101' is used to signal the completion of a regular branch instruction (IB), '110' is used to signal the completion of a load-branch instruction (ILB), and '111' is used to signal the completion of a store-branch instruction (ISB). The three branch-type encodings (101, 110, and 111) imply that the associated instruction was the target of a taken branch that could or could not be statically predicted. In general, a branch is indicated on the first instruction in a new basic block. When this first instruction is either a load or a store, then the PDO_InsComp signal takes values ILB or ISB, respectively, to indicate the combined condition of a branch and a load or store. If the PC can not be statically predicted for a an IB, ILB or ISB, then the PC is transmitted on the PDO_AD_n trace bus.

As previously described, trace data is output on a trace bus, PDO_AD_n. In general, when a PC change, load/store address, or load/store data information for the nth trace bus needs to be traced, these pieces of trace information are all sent out on the same PDO_AD trace bus. In general, the width of the PDO_AD trace bus is implementation dependent. In one embodiment, the trace bus PDO_AD is configured to be 32-bits wide. A first set of trace data includes PC values (TPC), load address values (TLA), store address values (TSA), and data values (TD). These trace data types are identified using the PDO_TType signal values of '001'to '100', respectively. Additional trace data beyond PC, address and data values can also be transmitted on trace bus PDO_AD. The width of each PDO_AD trace bus may not be adequate to transmit the entire address or data in one cycle, each transaction may take multiple cycles to transmit. A FIFO is therefore used to hold pending transactions and values. In one embodiment, if a transaction takes multiple cycles, then the least-significant bits are sent first, followed by the more-significant bits.

The PDO_Ttype_n signal is used to indicate the type of information being transmitted on the PDO_AD_n bus. In one embodiment, the PDO_Ttype_n signal can take on the values of Table 3.

TABLE 3

| PDO_TType | Description |
|---|---|
| 000 | No transmission this cycle (NT) |
| 001 | Begin transmitting the PC (TPC) |
| 010 | Begin transmitting the load address (TLA) |
| 011 | Begin transmitting the store address (TSA) |
| 100 | Begin transmitting the data value (TD) |
| 101 | Begin transmitting the processor mode and the 8-bit ASID value (TMOAS) |
| 110 | Begin user-defined trace record - type 1 (TU1) |
| 111 | Begin user-defined trace record - type 2 (TU2) |

As illustrated in Table 3, various data types can be output on each trace bus PDO_AD. The data type includes PC values (TPC), load address values (TLA), store address values (TSA), and data values (TD). These trace data types are identified using the PDO_TType signal values of '001' to '100, ' respectively. Specifically, PDO_TType signal value '101' is used to identify the transmission of processor mode and application space identity (ASID) information. The processor mode and ASID information 101 can be included as part of the synchronization information that is periodically transmitted. This portion of the synchronization information enables trace regeneration software 160 to identify the software state of the computer system being traced. The final data types that can be transmitted on trace bus PDO_AD are user-defined trace records TU1 and TU2. These user-defined trace records are identified using PDO_TType signal values '110' and '111, 'respectively.

Generally, the PDO_Tend_n signal indicates the last cycle of the current transaction on trace bus PDO_AD_n. This signal can be asserted in the same cycle that a transaction is started implying that the particular transaction only took one cycle to complete. In a multi-issue core, the PDO_Tend signals are synchronized for all the PDO_AD_n transmissions associated with instructions that graduate together.

The PDO_Tmode_n signal indicates the transmission mode for the bits transmitted on trace bus PDO_AD_n. The PDO_TMode signal can be used to signal to TCB 130 the type of compression that has been performed on the trace data that is transmitted on trace bus PDO_AD. This mode information is therefore used by TCB 130 to regenerate the program flow accurately.

The PDO_DataOrder_n signal is used to indicate the out-of-order nature of data that is traced out. In general, the use of the PDO_DataOrder signal enables TGL 120 to avoid having to include memory for storing data that are returned out-of-order. The data can simply be traced out as soon as they are available. Out-of-order transfers of data are further described in co-pending application Ser. No. 09/751,747, entitled "Configurable Out-Of-Order Data Transfer in a Coprocessor Interface," which is incorporated herein by reference in its entirety.

The PDO_DataOrder signal indicates the position of the data in the list of current outstanding load and stores starting at the oldest. In one embodiment, the PDO_DataOrder_n signal can take on the following values of Table 4.

TABLE 4

| PDO_DataOrder | Description |
|---|---|
| 0000 | data from oldest load/store instruction (is in-order) |
| 0001 | data from second-oldest load/store instruction |
| 0010 | data from third-oldest load/store instruction |
| 0011 | data from fourth-oldest load/store instruction |
| 0100 | data from fifth-oldest load/store instruction |
| 0101 | data from sixth-oldest load/store instruction |
| 0110 | data from seventh-oldest load/store instruction |
| 0111 | data from eighth-oldest load/store instruction |
| 1000 | data from ninth-oldest load/store instruction |
| 1001 | data from tenth-oldest load/store instruction |
| 1010 | data from eleventh-oldest load/store instruction |
| 1011 | data from twelfth-oldest load/store instruction |
| 1100 | data from thirteenth-oldest load/store instruction |
| 1101 | data from fourteenth-oldest load/store instruction |
| 1110 | data from fifteenth-oldest load/store instruction |
| 1111 | data from sixteenth-oldest load/store instruction |

Table 5 illustrates an example in which the program issues five loads, A, B, C, D, E, to be traced along with the corresponding PDO_DataOrder signals. In this example, it is assumed (for the purposes of simplicity) that the data is available the same clock cycle as the instruction.

TABLE 5

| Load | Cycle# | CacheOp | Load Data Available | Data Traced Out | PDO_DataOrder |
|---|---|---|---|---|---|
| A | 1 | Miss | — | — | — |
| B | 2 | Hit | B | B | 0001 (second oldest) |
| C | 3 | Hit | C | C | 0001 (second oldest) |

TABLE 5-continued

| Load | Cycle# | CacheOp | Load Data Available | Data Traced Out | PDO_DataOrder |
|------|--------|---------|---------------------|-----------------|---------------|
| D | 4 | Miss | — | — | — |
| E | 5 | Hit | E | E | 0010 (third oldest) |
| — | k | — | A | A | 0000 (oldest) |
| — | K + p | — | D | D | 0000 (oldest) |

In clock cycle 1, load A misses in the cache and goes to memory. Load A is therefore considered outstanding. In clock cycle 2, load B hits in the cache and is immediately available. Load B is then traced out with the PDO_DataOrder signal indicating that the load data is the second oldest outstanding load. Based on the values of Table 4, the PDO_DataOrder signal will have a value of '0001.' At this point, load A is considered the oldest outstanding load. In clock cycle 3, load C hits in the cache and is immediately available. Load C is then traced out with the PDO_DataOrder signal indicating with a value '0001' that the load data is the second oldest outstanding load. At this point, load A is still considered the oldest outstanding load. Load B is not considered outstanding as it was traced out at clock cycle 2. In clock cycle 4, load D misses in the cache and goes to memory. Load D is therefore considered outstanding. At this point, both load A and load D are the currently outstanding loads. Load A is considered the oldest outstanding load while load D is considered the second oldest outstanding load. In clock cycle 5, load E hits in the cache and is immediately available. Load E is then traced out with the PDO_DataOrder signal indicating with a value '0010' that the load data is the third oldest outstanding load behind load A and load D. In clock cycle k, load A returns from memory and is available. Load A is then traced out with the PDO_DataOrder signal indicating with a value '0000' that the load data is the oldest outstanding load. Finally, in clock cycle k+p, load D returns from memory and is available. Load D is then traced out with the PDO_DataOrder signal indicating with a value '0000' that the load data is the oldest outstanding load.

The PDO_Overflow signal is used to indicate that the current tracing is being abandoned due to a FIFO overflow. In this situation, TGL 120 discards all entries in FIFO 348, and restarts transmission from the next completed instruction. It should be noted that the first instruction to be signaled after the assertion of the PDO_Overflow signal should have its PC value sent as well. In effect, that instruction is treated as a IB, ILB, or ISB instruction.

In general, the tracing of the PC value is important where the PC value could not be statically predicted. Without this information, trace regeneration software 160 is unable to reconstruct the program execution path. For example, if the branch was unpredictable and the unpredictability lies in the branch target address, then the PC value should be transmitted. If the unpredictability lies in the branch condition (i.e., determining if the branch is taken or not), on the other hand, then the branch target PC value need not be transmitted. Here, it is sufficient to simply indicate that the branch was taken. For branch instructions where there is a jump in PC, several options exist. In one embodiment, the following rules can be applied: (1) when the branch is unconditional and the branch target is predictable, IB, ILB, or ISB is used for the PDO_InsComp value, and the PC value is not traced out; (2) when the branch is conditional, and the branch target is predictable, IB, ILB, or ISB is used only when the branch is taken and there is no need to trace out the PC value; and (3) when the branch is conditional or unconditional, and the branch target is unpredictable, IB, ILB, or ISB is used and the PC value is traced out using TPC for the PDO_TType signal. As an example, the PC value can be transmitted (a) after a JR or JALR instruction; (b) after a control transfer to an exception handler; (c) after a return from exception (ERET or DERET instruction); and (d) for resynchronization purposes. For ISB and ILB indications, the user may require that the target address and data be traced along with the transmitted PC value. In particular, for an ISB indication, the PC value is sent first, followed by the store address, and finally the store data. For an ILB indication, the PC value and load address are sent first, followed by the load data when it becomes available.

Figure 9:
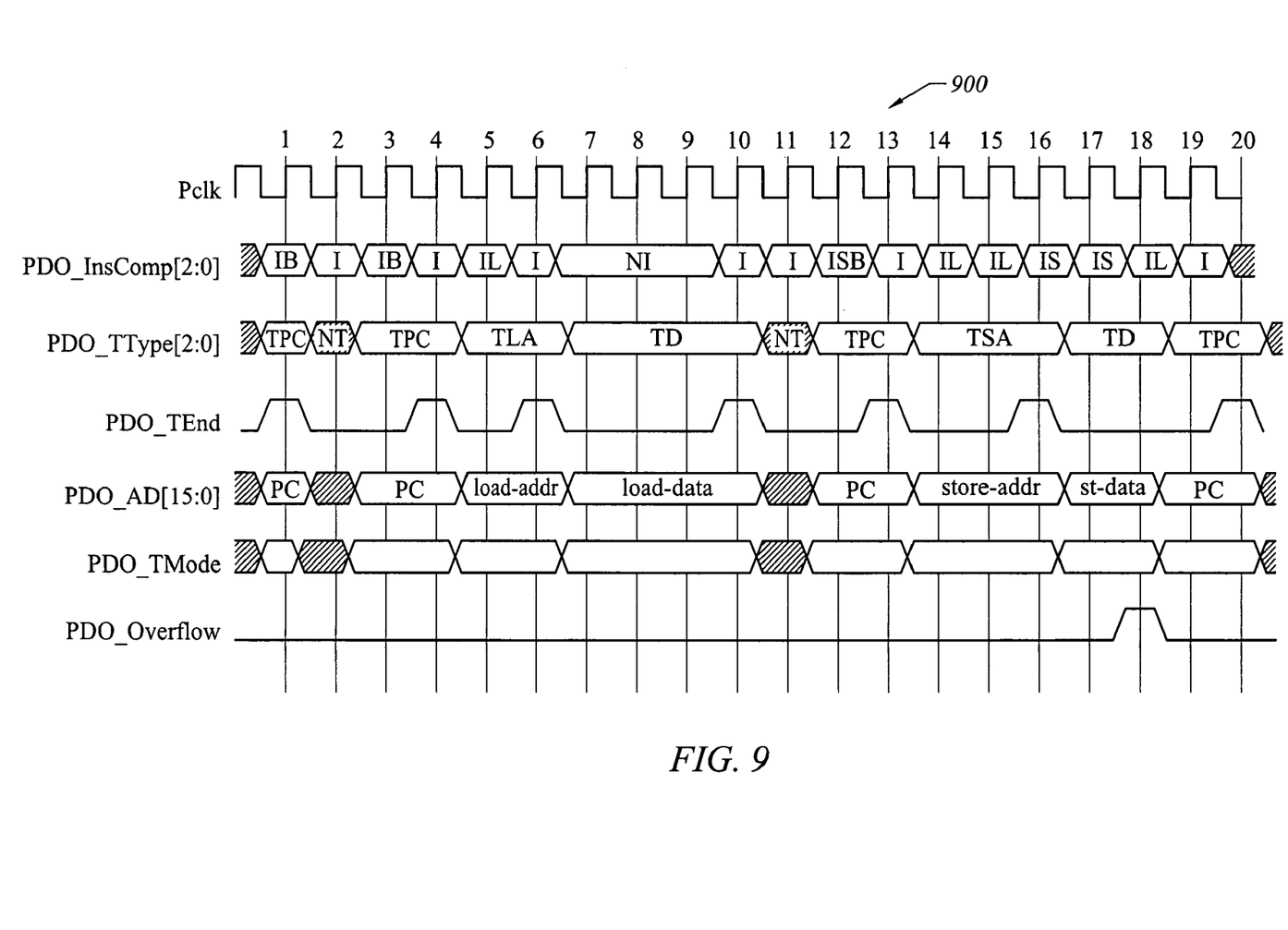
FIG. 9 is a timing diagram for a single instruction pipeline illustrating signals in an exemplary trace interface.

FIG. 9 is a timing diagram 900 for a single instruction pipeline illustrating the above-described interface for a single instruction pipeline relative to a clock signal Pclk. At clock cycle 1, PDO_InsComp[2:0] has a value IB, indicating the completion of a branch instruction. The value IB represents the completion of an instruction that could not be statically predicted. Accordingly, the PC value for the branch instruction should be traced, thereby enabling trace regeneration software 160 to recreate the execution of a new block of instructions.

The PC value for the branch instruction is transmitted on the trace bus PDO_AD[15:0]. The PDO_TMode signal indicates the transmission mode for the bits transmitted on trace bus PDO_AD[15:0]. At clock cycle 2, PDO_InsComp[2:0] has a value I, indicating the completion of an instruction within a block of instructions. As noted, the completion of an instruction within a block does not require the tracing of the PC value. Accordingly, no transmission occurs on trace bus PDO_AD[15:0]. The no transmission state is also signaled by the PDO_TType signal with a NT value.

At clock cycle 3, PDO_InsComp[2:0] has a value IB, indicating the completion of another branch instruction. The PC value is then transmitted on trace bus PDO_AD[15:0] with the data type TPC indicated on PDO_TType[2:0]. As illustrated, the transmission of the PC value requires two clock cycles (3 and 4). Accordingly, the PDO_TEnd signal is not asserted until the end of the transaction at clock cycle 4. Also occurring at clock cycle 4 is the signaling of value I on PDO_InsComp[2:0]. This indicates the completion of an instruction within a block of instructions and no transmission on trace bus PDO_AD[15:0] is required.

At clock cycle 5, PDO_InsComp[2:0] has a value IL, indicating the completion of a load instruction. Here, the PC value need not be transmitted. The user can specify, however, that the load address and data be traced. With the assumption that the load hit in the cache, the load address and data is immediately available. The load address is transmitted first on PDO_AD[15:0] at clock cycles 5 and 6, and the load data is transmitted next on PDO_AD[15:0] at clock cycles 7–10. In both cases, the corresponding data type is transmitted on PDO_TType[2:0] using signal values TLA and TD, respectively.

During the load address and data transmission at clock cycles 5–10, PDO_InsComp[2:0] further signals the completion of IL at clock cycle 5, I at clock cycle 6, NI at clock cycles 7–9, and I at clock cycle 10. Each of these instruction-completion indications did not require a transmission on trace bus PDO_AD[15:0]. Accordingly, the trace data FIFO did not overflow as it waited to be cleared during the six-cycle transmission of the load address and data during clock cycles 5–10.

At clock cycle 12, PDO_InsComp[2:0] indicates completion of a branch store instruction ISB. The PC value, store address, and store data are then transmitted on trace bus PDO_AD[15:0] at clock cycles 12–13, 14–16, and 17–18, respectively. As the trace data for the ISB indication completes, however, PDO_InsComp[2:0] continues to indicate the completion of additional instructions. Specifically, PDO_InsComp[2:0] indicates the sequential completion of I, IL, IL, IS, IS, and IL instructions at clock cycles 13–18, respectively.

While the completion of instruction I at clock cycle 13 does not require tracing of any data, the completion of the IL and IS instructions on each of clock cycles 14–18 can require tracing of a target address and data. Each of these pieces of trace data continues to fill FIFO 348 as the trace data associated with the ISB instruction at clock cycle 12 completes its transmission on trace bus PDO_AD. FIFO 348 therefore eventually overflows, as shown at clock cycle 18, indicating that FIFO 348 is being filled faster than it is being emptied. Timing diagram 900 illustrates an overflow condition at clock cycle 18. The overflow indication is indicated by the assertion of the PDO_Overflow signal, thereby indicating an internal FIFO overflow error.

Now that one implementation of trace interface 180 has been described, an illustrative example of a method of tracing from the point of graduation of a reorder buffer will now be described with regards to FIGS. 10–14. As an illustrative example, a two-issue core can trace two instructions and uses the signals PDO_InsComp_0 and PDO_InsComp_1 to represent the completion status values of two simultaneously graduating instructions.

Figure 10:
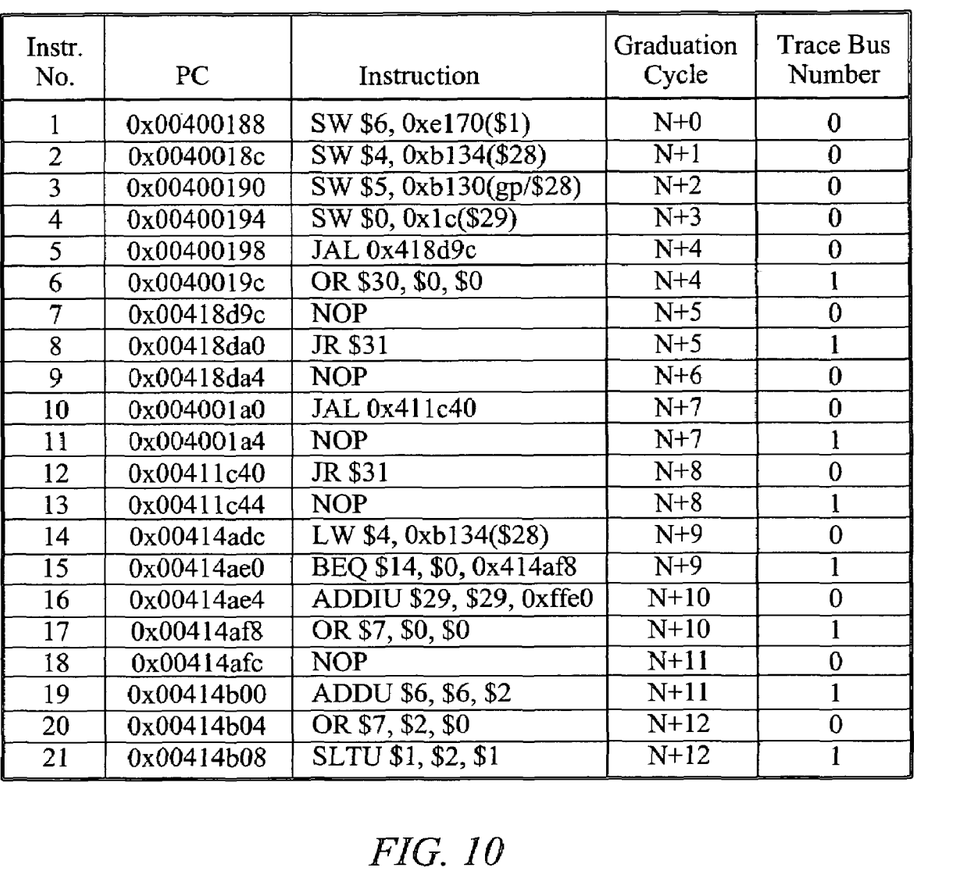
FIG. 10 is a table illustrating a method of tracing instructions in instruction order according to the graduation cycle of a reorder buffer.

FIG. 10 illustrates the cycle of graduation of each instruction from the reorder buffer and the number of the instruction trace slot (trace bus) that actually traces that instruction. The exemplary instructions are in the MIPS32 assembly language. The SW fragments correspond to store word instructions having a corresponding PDO_InsComp value of IS and a potential PDO_TType value of multiple cycles of TSA and TD. The JAL Instruction corresponds to a jump instruction having a corresponding PDO_InsComp value of I and a PDO_TType value of NT. The OR instruction has a PDO_InsComp value of I and a PDO_TType value of NT. The NOP instruction has a corresponding PDO_InsComp value of IB (target of the previous JAL) and a PDO_TType value of NT. The JR instruction has a corresponding PDO_InsComp value of I and a PDO_TType value of NT. The LW instruction has a corresponding PDO_InsComp value of ILB and a PDO_TType value of TPC and potentially TLA and TD. The BEQ instruction has a corresponding PDO_InsComp value of I and a corresponding PDO_TType value of NT. The ADDIU instruction has a corresponding PDO_InsComp value of I and a corresponding PDO_TType value of NT. The OR instruction has a corresponding PDO_InsComp value of I and a PDO_TType value of NT. The NOP instruction has a corresponding PDO_InsComp value of I and a PDO_TType value of NT. The ADDU instruction has a PDO_InsComp of I and a PDO_TType value of TMOAS. The SLTU instruction has a corresponding PDO_InsComp value of 1 and a PDO_TType value of NT. For simplicity, the instructions in the assembly fragment are also identified by an instruction number (Inst. No.) This example assumes a simple two-issue processor that allows up to one load/store instruction per issue and one branch instruction per cycle. In this example, 0, 1, or 2 instructions can graduate per cycle.

A preferred embodiment includes at least one rule to facilitate the TCB 130 organizing data to reconstruct the program sequence. One rule that is that the trace buses are implicitly ordered to facilitate determining the earliest instruction(s) and earliest data in a graduation cycle. For data transmissions that end on the same cycle, the data on trace bus PDO_AD_k may be assumed to be before the data on PDO_AD_k+1. For example, if there are two trace buses 0 and 1 for a two-issue multi-processor, trace bus 0 may be used to trace out the earliest instruction in the graduation cycle and trace bus 1 used to trace out the next earliest instruction in the graduation cycle. This rule facilitates keeping track of instruction order when more than one instruction graduates in a graduation cycle. An application of this rule can be seen in FIG. 10, in which the smallest number instruction in each graduation cycle is always assigned trace bus number 0. Thus, if two instructions graduate in the cycle, the earliest (smallest number) instruction can be distinguished.

Another rule that is that if an instruction is traced out on a particular instruction trace slot, say using trace bus PDO_InsComp_k, then all other information for that instruction is sent on the signals of the kth instruction trace slot (e.g., the kth trace bus). For example, the address and data, if any associated with that instruction is also sent on the PDO_AD_k bus. This facilitates reconstructing the program sequence, since both instructions and associated data are received from the same trace bus. However, in one embodiment, an exception is made when the data is not immediately available. In this situation the data can be sent on an PDO_AD_n bus that is temporarily free and hence chosen by the processor to send that data, e.g. using the out of load store (PDO_DataOrder) signals.

Another rule to assist TCB 130 to identify the data associated with particular instructions is to synchronize the end points for transmitting data from a graduation cycle for all trace buses. In one embodiment, data associated with instructions that are traced together on the different PDO_InsComp_n trace buses are such that their end points (i.e. the last data cycle) are synchronized. This rule facilitates an external trace control block sequencing all the data operations in the various PDO_AD_n buses into the program sequence.

Figure 11:
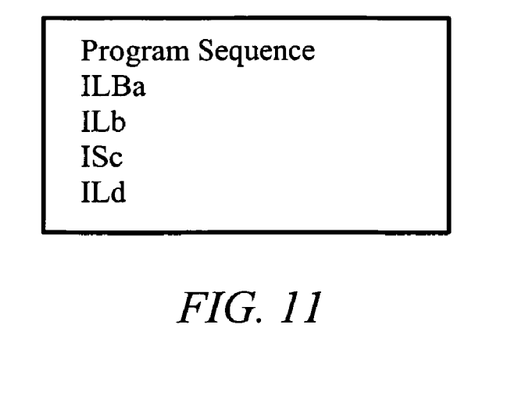
FIG. 11 is a table illustrating an exemplary program sequence.

FIGS. 11–14 illustrate example of how the above-described rules may be applied to facilitate multi-issue tracing. FIG. 11 shows a block of information corresponding to instruction complete (PDO_InsComp) values in a program sequence, i.e., ILBa is instruction number 1, ILb is instruction number 2, ISc is instruction number 3, and ILd is instruction number 4. As previously mentioned, a reorder buffer would sequence the instructions in program order.

Figure 12:
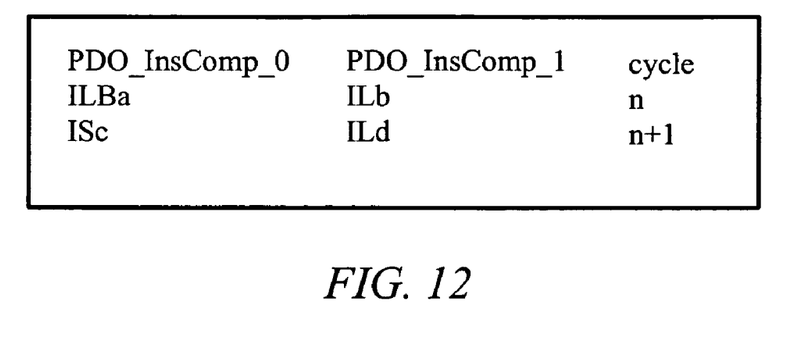
FIG. 12 illustrates the corresponding instruction complete signals for the program sequence of FIG. 11.

FIG. 12 shows the values of the block of information as they would be transmitted on two instruction trace slots, i.e., PDO_InsComp_0 and PDO_InsComp_1 for graduation cycles n and n+1. In this example, instructions traced out on trace slot 0 are presumed to have a lower instruction number than instructions traced out on trace slot 1. In this example, the instructions are traced out in two graduation cycles.

Figure 13:
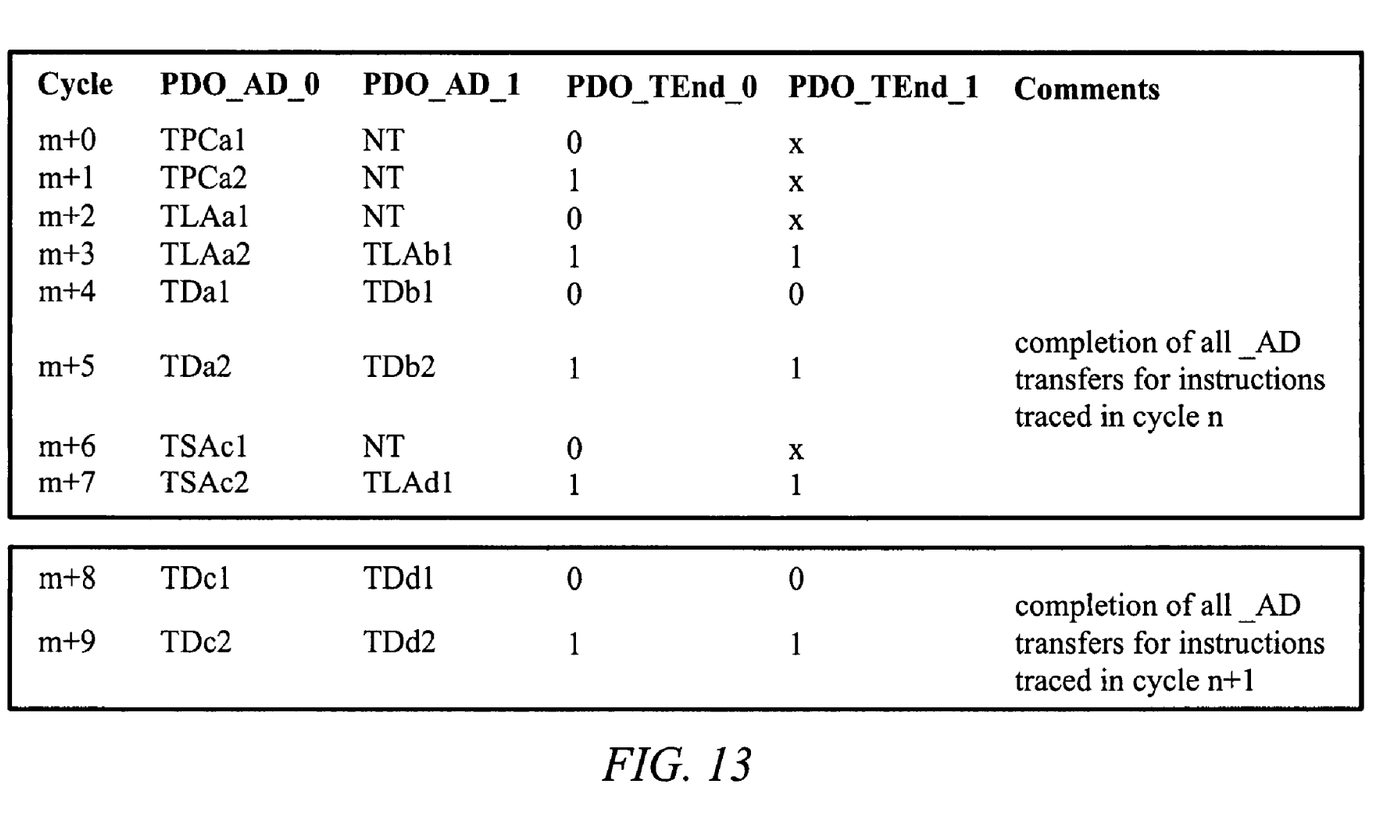
FIG. 13 illustrates the trace bus data signals and end point signals associated with FIGS. 11–12.

FIG. 13 shows the corresponding PDO_AD and PDO_Tend values for the two trace slots. As previously discussed, the PDO_AD may correspond to PC, load-addr, load data, store-addr, or store data depending upon the corresponding PDO_InsComp value. In this example, the data trace information for the instructions that were simultaneously traced on PDO_InsComp_0 and PDO_InsComp_1 are traced such that their PDO_Tend signals are coordinated to facilitate ordering the data received from the trace buses in program sequence. For the PDO_InsComp values traced in cycle n, the data transmission ends in cycle m+5. And for the PDO_InsComp values traced in cycle n+1 the data transmission ends in cycle m+9.

Figure 14:
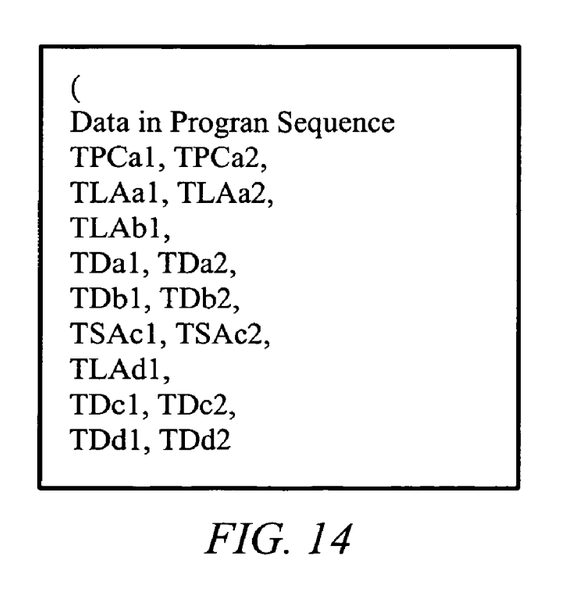
FIG. 14 illustrates an exemplary data sequence reconstructed from the signals of FIGS. 12–13.

FIG. 14 illustrates how an external block reading the signals on the interface can take the data values from the two PDO_AD buses, and knowing the program sequence, can put the traced data in order. For a particular trace bus, the PDO_Tend signal indicates that one transaction is completed, e.g., the PDO_Tend_0 signal at cycle m+2 indicates the completion of the transaction of transmitting a first group of PC data, TPCa1 and TPCa2. By giving precedence to transactions that begin earlier in time and the rules for trace buses, the PDO_Tend signals in cycle 3 permit a determination that the next orderings of data is TLAa1, TLAa2 and TLAb1. In cycle 5, all of the transfers are complete for instructions traced in cycle n. Since the transfers complete at the same time and since the data transferred on the $0^{th}$ trace bus can be assumed to occur earlier than for the $1^{st}$ trace bus, the data may be sequenced into TDa1, TDa2 sequenced before TDb1, TDb2.

The present invention may be applied to out of order loads and stores in the multi-pipe core. When a multi-issue processor needs to send out of order data, it uses the PDO_DataOrder signal to indicate that the data is out-of-order. When an out-of-order data is returned, it can be traced on any free PDO_AD n bus, not necessarily the one that traced the corresponding instruction. This is because instruction tracing is sequentialized by the PDO_InsComp_n order and therefore the data can be associated with the correct instruction once the PDO_DataOrder value is known. Note that since the PDO_AD_n trace buses are implicitly ordered, for data transmissions that end on the same cycle, the data on PDO_AD_k is before the data on PDO_AD_k+1.

With the method of tracing graduating instructions in sequence, it is not possible to know which instructions issue together without additional information. This information might be useful to tune a code optimizer for high performance microprocessors. In one embodiment, in order to trace this information, the processor tags all the instructions that issue together, using the signal PDO_IssueTag_n. This tag value is also traced out with each PDO_InsComp_n value. In one embodiment, a tag value of 6 bits is used, assuming an issue window of about 64 instructions. Note that this tag information can be traced out of the TCB only if the user requires it, hence it will not incur bandwidth on the external pins unless there is a real need for the information. Thus, it is recommended that the TCB allow the external tracing of this information under discretion.

In addition to embodiments of the invention using hardware, the invention can be embodied in a computer usable medium configured to store computer readable code (e.g., computer readable program code, data, etc). The computer code causes the enablement of the functions or fabrication, or both, of the invention disclosed herein.

For example, this can be accomplished through the use of general programming languages (e.g., C, C++, JAVA, etc.) GDSII databases; hardware description languages (HDL) including Verilog HDL, VHDL, Altera Hardware Description Language (AHDL) and so on; or other programming and/or circuit (i.e., schematic) capture tools available in the art.

The computer code can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets.

It is understood that the invention can be embodied in computer code (e.g., as an HDL program) as part of a semiconductor intellectual property core (e.g., a microprocessor core) or a system level design (e.g., a system on chip) and transformed to hardware as part of the production of integrated circuits. Also, the invention may be embodied as a combination of hardware and computer code.

While embodiments have been described with regards to a multi-issue processor that includes a reorder buffer for placing instructions in program sequence order, it will also be understood that the tracing method of the present invention is not limited to processors including a reorder buffer. For example, more generally the tracing method of the present invention may be applied to multi-issue processors having an element for placing instructions back in program sequence order.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for tracing instructions in a multi-issue microprocessor core that supports execution of instructions in a plurality of instruction pipelines and which is capable of issuing a plurality of instructions per cycle, comprising:

placing out-of-order issued instructions received from said plurality of instruction pipelines in program sequence order for execution;

selecting an integer non-negative number n of issued instructions to be graduated on each cycle with the maximum number of instructions graduating per cycle depending on the number of issue slots of said multi-issue microprocessor core; and for graduating instructions, transmitting trace data for said issued instructions according to the program sequence order.

2. The method of claim 1, wherein said trace data is transmitted using an interface having a plurality of trace buses with each trace bus having an associated trace bus number, the method further comprising:

for each cycle, assigning to each instruction to be traced out a trace bus such that the relative instruction order of a plurality of graduating instructions may be determined from the associated trace bus numbers of the trace buses of said interface utilized to transmit said trace data.

3. The method of claim 2, wherein said transmitting trace data further comprises: for each instruction traced out, transmitting data associated with said instruction on the same trace bus used to trace out the instruction.

4. The method of claim 2, wherein said transmitting trace data further comprises: for each instruction traced out, transmitting data associated with the instruction on the first available trace bus together with data order information for associating data with a particular instruction.

5. The method of claim 2, further comprising: coordinating transaction end points on the trace buses to be the cycle to facilitate determining program sequence order.

6. The method of claim 1, wherein said trace data includes program counter information.

7. The method of claim 1, wherein said trace data includes one or more of load address data, load data, store address, and store data information.

8. The method of claim 1, wherein said transmitting comprises transmitting an issue tag signal for the instructions to facilitate a determination of whether instructions issued together and on which cycle.

9. The method of claim 1, wherein a reorder buffer is used to place instructions in program sequence order, said reorder buffer having a graduation cycle for graduating instructions in program order; and wherein transmitting trace data comprises transmitting trace data for said instructions in graduation order for each graduation cycle along with information that enables a determination of program execution of said instructions.

10. In a system having a multi-issue microprocessor core that supports execution of instructions in a plurality of instruction pipelines and which is capable of issuing a plurality of instructions per cycle, a tracing apparatus, comprising:
   a reorder buffer to place out-of-order issued instructions received from said plurality of instruction pipelines in program sequence order for execution, said reorder buffer selecting an integer non-negative number n of issued instructions to be graduated on each cycle with the maximum number of instructions graduating per cycle depending on the number of issue slots of said multi-issue microprocessor core;
   a trace generation module monitoring said reorder buffer and transmitting trace data for each graduation cycle of the reorder buffer along with information that enables a determination of program execution of said instructions.

11. The system of claim 10, wherein said trace generation module is configured to assign trace data to a plurality of trace buses such that the relative instruction order of graduating instructions may be determined from associated trace bus numbers of said plurality of trace buses.

* * * * *